July 11, 1933.     T. HILL ET AL     1,917,585
JACK
Filed July 30, 1932     2 Sheets-Sheet 2
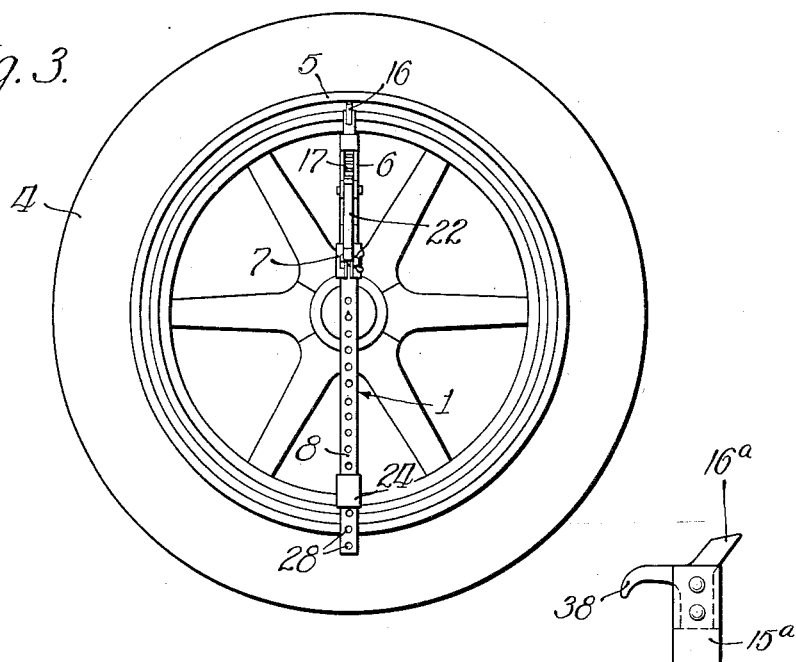
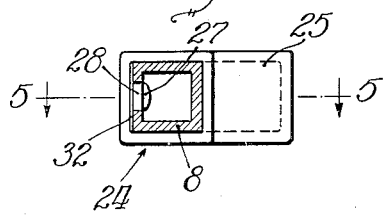
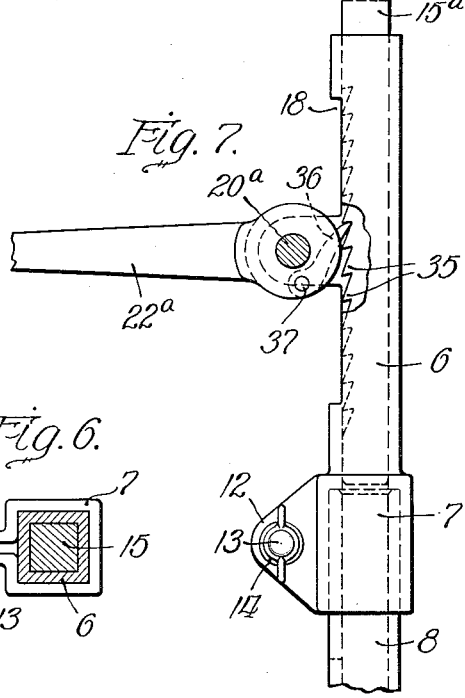
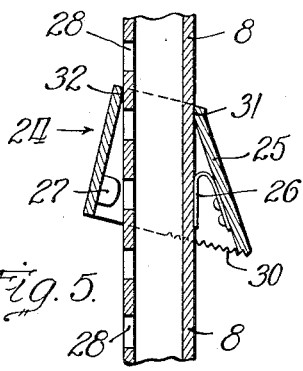
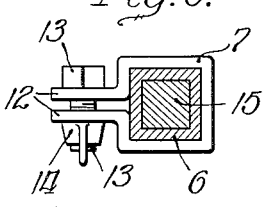
Inventors:
Truman Hill
Ervin H. Zimmerman
By: Brown, Jackson, Boettcher & Diener,
Attys.

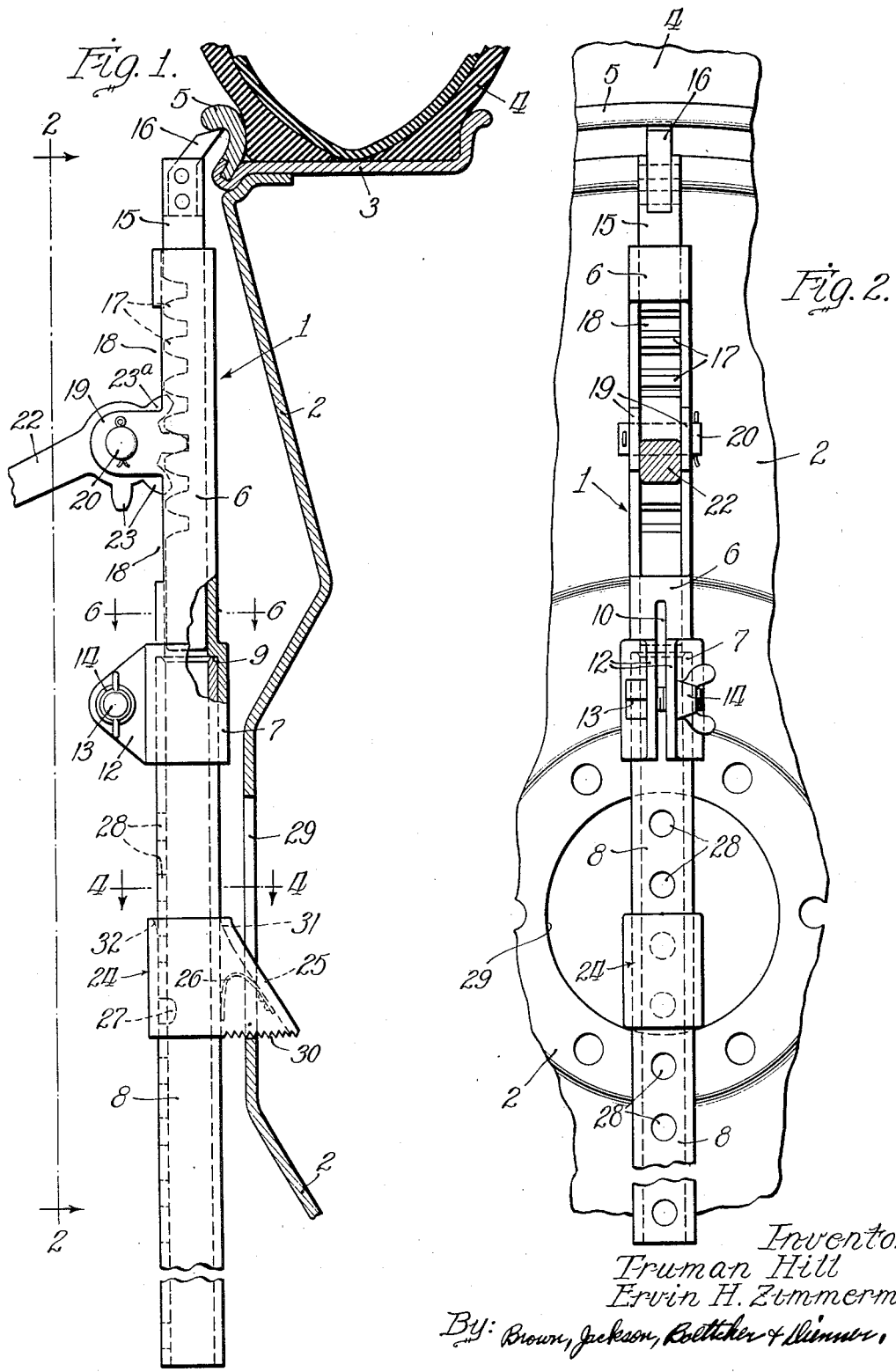

Patented July 11, 1933

1,917,585

UNITED STATES PATENT OFFICE

TRUMAN HILL AND ERVIN H. ZIMMERMAN, OF PERRY, ILLINOIS

JACK

Application filed July 30, 1932. Serial No. 626,402.

This invention relates to a jack and is more particularly concerned with a jack that is utilized for removing a retaining ring of the type commonly used for holding a tire upon the rim of an automobile wheel.

Considerable difficulty has been heretofore experienced in removing a tire retaining ring from the rim of an automobile wheel, particularly when the ring has rusted onto the rim. Oft times the retaining ring cannot be conveniently and readily removed from the rim because of injury to the wheel such as may directly cause deformation of the ring or rim or both.

The present invention therefore, contemplates the provision of a means that can be operatively associated with an automobile wheel for expeditiously and conveniently removing a retaining ring from the rim of said wheel with a minimum amount of time and effort.

Another of the objects of the present invention is to provide a jack of the type defined which is constructed of comparatively few and durable parts that are rigidly related when assembled so as to withstand considerable abuse while being employed in the capacity for which it was devised.

Other objects and advantages will hereinafter appear from the following detailed description of a preferred embodiment of the device of this invention, reference being had to the accompanying drawings.

In the drawings:

Figure 1 is a side elevational view of such embodiment partially broken away and in section and illustrating the same as applied to an automobile wheel of disc wheel type;

Figure 2 is a front elevational view of the jack illustrated in Figure 1 and taken substantially along the line 2—2 of Figure 1;

Figure 3 is a side elevational view substantially corresponding to Figure 2 but illustrating the preferred embodiment of the present device as applied to another type of automobile wheel;

Figure 4 is a sectional view taken substantially along the line 4—4 in Figure 1;

Figure 5 is a vertical longitudinal sectional view taken substantially along the plane of the line 5—5 in Figure 4;

Figure 6 is a plan sectional view taken substantially along the line 6—6 in Figure 1; and Figure 7 is a fragmentary side elevational view of a modified form of the invention.

Referring now more particularly to Figures 1 and 2, the jack, designated in its entirety by numeral 1, is associated with an automobile wheel 2 of the disc wheel type having a rim 3 for the reception of a tire 4, the latter being held upon the rim 3 in its normal operating relation thereto by means of a retaining ring 5. Obviously, the wheel structure illustrated forms no part of the present invention but merely exemplifies one type of a standard automobile wheel of known construction. The jack 1, in the main, comprises a frame including a member 6, terminating at one end in a socket 7, and a shank or extension member 8 fitting into socket 7. The member 6 and its socket 7 are preferably of square cross-section as is the extension or shank 8, the latter snugly fitting into the socket 7 and abutting the shoulder 9, and being secured within the socket by any suitable means. In the present construction member 6 is preferably in the form of a channel bar provided with a slot 10 and having suitable ears 12 disposed adjacent thereto for suitably receiving a securing means comprising a bolt 13 carrying a thumb nut 14. By operating the nut 14, the shank 8 is securely clamped within the socket portion 7 of member 6. A bolt or plunger 15, in the form of a rack bar and preferably of square cross-section, is slidably carried by member 6 for endwise movement relative thereto, the extended end of the plunger being provided with a hard metal tip or abutment member 16. The tip 16 is preferably offset from the central plane of the jack to effect a proper amount of clearance between the jack and the wheel, and although the tip is illustrated as fixedly secured to the plunger 15 it may, if desired, be adjustably secured thereto.

Various mechanisms may be employed for actuating the plunger 15 endwise of the jack but it is preferable to utilize the means illustrated in Figures 1 and 2. In the preferred construction one face or portion of member 6 is cut away to expose the plunger or bolt 15 which is provided with teeth 17 that are accessible through the opening 18 so formed. Member 6 is further provided with extensions or ears 19 for suitably supporting pivotal means such as the pin or shaft 20, the latter rotatably supporting a handle or lever 22. Lever 22 is suitably provided with teeth 23 which are adapted for cooperation with teeth 17 through the opening 18 provided in member 6. By operating the lever 22, the bolt or plunger 15 is actuated endwise of the member 6. Moreover the teeth 23 are so arranged with respect to lever 22 that, if the latter is rotated upwardly into vertical position, the last tooth 23a will clear the teeth 17 of the rack or plunger 15 whereby the latter is movable independently of the teeth on lever 22.

The shank or extension 8 is provided with an adjustable stop or foot 24, the latter providing means for positioning the jack in abutting engagement with a fixed portion of the wheel. The stop or foot 24 is preferably constructed in the manner best illustrated in Figures 1, 4, and 5. The foot is so shaped that it normally has three walls thereof disposed adjacent the shank, the fourth wall 25 being inclined outwardly and away from the shank. Suitable means, such as a spring 26, may be connected with wall 25 to engage the shank for maintaining the foot 24 in its normal position relative to the shank as viewed in Figure 1. Foot 24 when in the normal position referred to, is locked against movement endwise of shank 8 by means of a stud or pin 27 which is insertable into any one of a number of openings 28 provided in shank 8, the pin being maintained within its selected opening through the action of spring 26. To adjust foot 24 lengthwise of shank 8, it is moved into the position illustrated in Figure 5 against the action of spring 26, whereby the pin 27 is drawn out of the particular opening 28 wherein it was located.

In Figure 1 the foot is so adjusted with reference to shank 8 as to engage the edge of the wheel at the hub opening 29 in wheel 2, the foot preferably being serrated as at 30 to insure a better grip of the foot upon that portion of the wheel which it engages. To facilitate the rotation or rocking of foot 24 relative to shank 8, the upper portion 31 of wall 25 is preferably curved so as to be disposed substantially tangentially to the adjacent wall of the shank when it is in normal operating position. A portion of the wall that is oppositely disposed from wall 25 is also beveled or curved as at 32 to further facilitate the rocking of the foot when adjusting the same lengthwise of shank 8. Obviously, any force acting upwardly against the serrated portion of the foot will tend to rotate the same counterclockwise as viewed in Figure 1, about a virtual pivotal point located substantially at the point where the curved portion 31 of wall 25 contacts shank 8, thereby firmly forcing pin 27 into the selected opening 28 wherein the pin is disposed and positively maintaining the same in that position. Therefore, although spring 26 does function to hold the pin in cooperating engagement within an opening in shank 8, the spring is primarily employed for preventing the foot or stop from dropping off of the shank or moving relative thereto when applying the jack to a wheel or when otherwise moving the jack from place to place. This greatly enhances the utility of the jack and adds to its convenience in handling as well as expediting the operation of the jack when removing a retaining ring from a wheel.

The jack is readily applicable to a wheel to function in the capacity for which it was devised. By raising the handle or lever 22 into a position which the operator will best know from experience to be sufficient to cause, when operated, ample movement of the plunger to remove the retaining ring, and by adjusting the foot into abutting engagement with some fixed portion of the wheel from which the retaining ring is to be removed, the jack will then be set for operation. A slight movement of the handle or lever will bring the tip 16 into engagement with the retaining ring, further movement of the lever causing the ring to move radially of the wheel rim and out of its operative or retaining position therewith. The jack can be applied to any form of wheel, and as hereinbefore explained, in Figure 1 it is associated with a disc wheel. In Figure 3 the same jack is illustrated as associated with a spoked wheel to demonstrate its general utility.

The tip element 16 of pressure applying bar 15, when in contact with retaining ring 5, provides a fulcrum about which the jack may be swung to bring foot member 25 into close contact with the wheel disc or other cooperating abutment. This provides a compensating adjustment which assures proper contact of the foot member with the abutment, after the foot member has been adjusted on the shank into approximate position for such contact. In this manner, necessity for precision in adjusting the foot member on the shank is eliminated, which facilitates and expedites use of the jack, and maximum outward movement of bar 15 is available for forcing ring 5 out of rim 3.

Figure 7 illustrates a modified form of jack wherein the operating mechanism comprises ratchet means. The general structure of this form of jack is analogous to that of the preferred form of jack, but here the bolt or plunger 15a is provided with a plurality of ratchet teeth 35 that are engaged by a pawl or dog 36 pivotally connected at 37 to a handle or lever 22a. The pawl is therefore supported for rotation about its pivot 37 and for bodily rotation with said lever about the latter's supporting pin or shaft 20a. With this construction, the bolt or plunger 15a is manually movable upwardly independently of the lever and its associated pawl. This facilitates adjusting the jack upon a wheel for operation, since the foot can be conveniently placed into abutting engagement with some fixed portion of the wheel, and the plunger may thereafter be manually raised until the hardened metal tip 16a is brought into contact with the retaining ring of said wheel. The latter manual act is accomplished without imparting any movement to the lever which can be raised to any position conveniently adapted for its operative downstroke, or having been raised, can then be immediately operated downwardly. In either case, the pawl will move the plunger upwardly by means of its contact with the teeth of the latter. Any suitable finger hold means may be connected with the plunger for the purpose of manually raising the same independently of the position of the lever. In this instance, the tip 16a is provided with an extension member or finger hold 38 for that purpose. Moreover, the pawl is so positioned and arranged, that upon raising the lever into substantially vertical position, the pawl will be entirely disengaged from the plunger ratchet teeth to allow the plunger to drop freely through gravity.

Obviously, there are other mechanisms that may be employed for operating the jack and for obtaining the adjustments thereof when applying the same to the wheel, and changes may be made in the exemplified construction without departing from the essence and scope of the present invention. Therefore, we do not intend to be limited to the jack illustrated and described, but only in so far as the same is so limited in the appended claims.

What we claim is:

1. In combination in a jack, a frame, a pressure applying bar telescoping the frame, an operating lever mounted on the frame at one side thereof, operating connections between the lever and the bar, a foot member adjustable lengthwise of the frame and projecting from the opposite side of and substantially at right angles to said frame, and means for securing the foot member in adjustment on the frame.

2. In combination in a jack for removing a tire retaining ring from the rim of an automobile wheel, a frame, a foot member adjustable lengthwise of the frame and projecting from said frame substantially at right angles thereto, means for securing the foot member in adjustment on the frame and for holding it against movement lengthwise of the frame by pressure incident to the use of the jack, a pressure applying bar telescoping the frame and provided at its outer end with a tip element disposed to contact the retaining ring, and means for forcing the bar outwardly of the frame, the tip element when in contact with the ring providing a fulcrum about which the jack may be swung to bring the foot member into close contact with a cooperating abutment.

In witness whereof, we hereunto subscribe our names this 29 day of June, 1932.

TRUMAN HILL.
ERVIN H. ZIMMERMAN.